(12) United States Patent
Kweon et al.

(10) Patent No.: US 6,797,435 B2
(45) Date of Patent: Sep. 28, 2004

(54) POSITIVE ACTIVE MATERIAL FOR RECHARGEABLE LITHIUM BATTERIES AND METHOD OF PREPARING THE SAME

(75) Inventors: Ho-Jin Kweon, Cheonan (KR); Jun-Won Suh, Cheonan (KR)

(73) Assignee: Samsung SDI Co., Ltd., Suwon-si (KR)

(*) Notice: Subject to any disclaimer, the term of this patent is extended or adjusted under 35 U.S.C. 154(b) by 178 days.

(21) Appl. No.: 10/046,557

(22) Filed: Jan. 16, 2002

(65) Prior Publication Data

US 2002/0142224 A1 Oct. 3, 2002

(30) Foreign Application Priority Data

Jan. 19, 2001 (KR) ................................. 10-2001-3212

(51) Int. Cl.$^7$ .............................................. H01M 4/50
(52) U.S. Cl. .......................... 429/231.95; 429/218.1; 429/231.5; 29/623.5; 252/182.1
(58) Field of Search ............................ 429/137, 209, 429/218.1, 231.2, 231.5, 231.95, 232, 238, 245, 223, 224, 218.2, 231.1; 427/126.4, 126.3, 126.1, 215, 299; 252/182.1; 29/623.5

(56) References Cited

U.S. PATENT DOCUMENTS

| | | | |
|---|---|---|---|
| 5,292,601 A | | 3/1994 | Sugeno et al. |
| 5,705,291 A | * | 1/1998 | Amatucci et al. ............ 429/137 |
| 5,783,328 A | * | 7/1998 | Wang .......................... 429/137 |
| 6,558,844 B2 | * | 5/2003 | Howard et al. ........... 429/231.1 |
| 2002/0076486 A1 | * | 6/2002 | Kweon et al. ............ 427/126.1 |

* cited by examiner

Primary Examiner—Frankie L. Stinson
Assistant Examiner—Monique Wills
(74) Attorney, Agent, or Firm—Staas & Halsey LLP (57) ABSTRACT

A positive active material includes a core including a lithiated compound, and at least two surface-treatment layers formed on the core. The surface-treatment layer includes at least one compound selected from the group consisting of a coating-element-included hydroxide, a coating-element-included oxyhydroxide, a coating-element-included oxycarbonate, and a coating-element-included hydroxycarbonate. The coating element is selected from the group consisting of Mg, Al, Co, K, Na, Ca, Si, Ti, Sn, V, Ge, Ga, B, and As.

25 Claims, 5 Drawing Sheets

POSITIVE ACTIVE MATERIAL FOR RECHARGEABLE LITHIUM BATTERIES AND METHOD OF PREPARING THE SAME

CROSS REFERENCE TO RELATED APPLICATION

This application is based on Korean Patent Application No. 2001-3212 filed in the Korean Industrial Property Office on Jan. 19, 2001, the disclosure of which is incorporated hereinby reference.

BACKGROUND OF THE INVENTION

1. Field of the Invention

The present invention relates to a positive active material for a rechargeable lithium battery and a method of preparing the same, and more particularly, to a positive active material for a rechargeable lithium battery having improved capability, power, and cycle-life characteristics, and a method of preparing the same.

2. Description of the Related Art

Generally, rechargeable lithium batteries use a material from or into which lithium ions are deintercalated or intercalated for positive and negative active materials. For an electrolyte, an organic solvent or a polymer is used. A rechargeable lithium battery produces electric energy as a result of changes in the chemical potentials of the active materials during the intercalation and deintercalation reactions of the lithium ions.

Such a rechargeable lithium battery, having an average discharge potential of 3.7 V (i.e., a battery having a substantially 4 V average discharge potential) is considered to be an essential element in the digital generation since it is an indispensable energy source for portable digital devices such as a cellular telephone, a notebook computer, a camcorder and so on (i.e., the "3C" devices).

For the negative active material in a rechargeable lithium battery, metallic lithium was used in the early days of development. Recently, however, carbon materials such as amorphous carbon or crystalline carbon-based materials, which reversibly intercalate lithium ions, are extensively used instead of the metallic lithium due to problems of high reactivity toward electrolyte and dendrite formation of the metallic lithium. With the use of carbon-based active materials, the potential safety problems that are associated with the metallic lithium can be prevented while achieving a relatively high energy density as well as a much improved cycle life. In particular, boron may be added to carbonaceous materials to produce boron-coated graphite (BOC) in order to increase the capability of the carbonaceous materials.

For the positive active material in the rechargeable lithium battery, chalcogenide compounds into or from which lithium ions are intercalated or deintercalated are used. Typical examples include $LiCoO_2$, $LiMn_2O_4$, $LiNiO_2$, $LiNi_{1-x}Co_xO_2$ (0<x<1), and $LiMnO_2$. Manganese-based positive materials such as $LiMn_2O_4$ or $LiMnO_2$ are the easiest to prepare, are less expensive than the other materials, and are environmentally friendly. However, manganese-based materials have a disadvantage of a relatively low capability. $LiNiO_2$ is inexpensive and has high capacity, but is difficult to prepare in the desired structure. $LiCoO_2$ is relatively expensive, but is widely used and is commercially available as it has good electrical conductivity and high cell voltage. Although most of the current commercially available rechargeable lithium batteries (approximately 95%) use $LiCoO_2$ as the positive active material, it is rather expensive. Therefore, there are considerable demands to find a less expensive alternative material.

As one scheme to satisfy such a demand, in U.S. Pat. No. 5,292,601, $Li_xMO_2$ (wherein M is an element selected from Co, Ni, or Mn, x is 0.5–1) is suggested as an alternative material for $LiCoO_2$ as the positive active material. U.S. Pat. No. 5,075,291 discloses a method of fabricating a rechargeable lithiated intercalation compound for the positive active material including mixing a coating composition comprising boron oxide, boric acid, lithium hydroxide, aluminum oxide, lithium aluminate, lithium metaborate, silicon dioxide, lithium silicate, or mixtures thereof with a lithiated intercalation compound in a particulate form, and fusing the coating compound at a temperature higher than about 400° C., thereby coating the particulate with the fused coating compound.

However, there are still further demands and desires for an improved positive active material having enhanced capacity, power, and cycle-life performance for batteries.

SUMMARY OF THE INVENTION

It is an object of the present invention to provide a positive active material for a rechargeable lithium battery cell exhibiting better cycle-life characteristics, enhanced power capability, and good voltage performance.

It is another object of the present invention to provide a method of preparing the same.

Additional objects and advantages of the invention will be set forth in part in the description which follows and, in part, will be obvious from the description, or may be learned by practice of the invention.

In order to achieve the above and other objects, an embodiment of the present invention provides a positive active material for a rechargeable lithium battery including a core including a lithiated compound, and at least two surface-treatment layers formed on the core.

According to another embodiment of the invention, the surface-treatment layers include at least one compound selected from a coating-element-included hydroxide, a coating-element-included oxyhydroxide, a coating-element-included oxycarbonate, or a coating-element-included hydroxycarbonate where the coating element includes at least one element selected from the group consisting of Mg, Al, Co, K, Na, Ca, Si, Ti, Sn, V, Ge, Ga, B, and As.

According to yet another embodiment of the invention, the lithiated compound is one or more compounds selected from the following compounds having formulas (1) to (13):

| | |
|---|---|
| $Li_xMn_{1-y}M_yA_2$ | (1) |
| $Li_xMn_{1-y}M_yO_{2-z}X_z$ | (2) |
| $Li_xMn_2O_{4-z}X_z$ | (3) |
| $Li_xMn_{2-y}M_yA_4$ | (4) |
| $Li_xCo_{1-y}M_yA_2$ | (5) |
| $Li_xCo_{1-y}M_yO_{2-z}X_z$ | (6) |
| $Li_xNi_{1-y}M_yA_2$ | (7) |
| $Li_xNi_{1-y}M_yO_{2-z}X_z$ | (8) |
| $Li_xNi_{1-y}Co_yO_{2-z}X_z$ | (9) |
| $Li_xNi_{1-y-z}Co_yM_zA_\alpha$ | (10) |
| $Li_xNi_{1-y-z}Co_yM_zO_{2-\alpha}X_\alpha$ | (11) |
| $Li_xNi_{1-y-z}Mn_yM_zA_\alpha$ | (12) |
| $Li_xNi_{1-y-z}Mn_yM_zO_{2-\alpha}X_\alpha$ | (13) | where $0.95 \leq x \leq 1.1$, $0 \leq y \leq 0.5$, $0 \leq z \leq 0.5$, $0 \leq a \leq 2$, M is one selected from the group consisting of Al, Ni, Co, Mn, Cr, Fe, Mg, Sr, V, and rare earth elements, A is selected from the group consisting of O, F, S and P, and X is selected from the group consisting of F, S and P.

According to still another embodiment of the invention, in the positive active material for a rechargeable lithium battery, the surface-treatment layers include one or more coating elements selected from the group consisting of Mg, Al, Co, K, Na, Ca, Si, Ti, Sn, V, Ge, Ga, B, and As.

According to yet still another embodiment of the invention, the positive active material for a rechargeable lithium battery includes a first surface-treatment layer and a second surface-treatment layer, where the first surface-treatment layer includes one or more coating elements selected from the group consisting of Mg, Al, Co, K, Na, Ca, Si, Ti, Sn, V, Ge, Ga, B, and As, and the second surface-treatment layer is formed on the first surface-treatment layer and includes one or more coating elements selected from the group consisting of Mg, Al, Co, K, Na, Ca, Si, Ti, Sn, V, Ge, Ga, B, and As.

According to a further embodiment of the invention, the positive active material for a rechargeable lithium battery includes three or more surface-treatment layers including one or more coating elements selected from the group consisting of Mg, Al, Co, K, Na, Ca, Si, Ti, Sn, V, Ge, Ga, B, and As.

According to a still further embodiment of the invention, a method of preparing a positive active material for a rechargeable lithium battery includes coating a lithiated compound selected from the lithiated compounds represented by the formulas (1) to (13) with a coating liquid including a coating element selected from the group consisting of Mg, Al, Co, K, Na, Ca, Si, Ti, Sn, V, Ge, Ga, B, and As, and drying the coated compound.

According to a yet further embodiment of the invention, the coating and drying includes providing a first surface-treatment layer on the surface of the lithiated compound followed by providing a second surface-treatment layer on the first surface-treatment layer.

According to a yet still further embodiment of the invention, the first surface-treatment layer is formed by first coating the lithiated compound with a coating liquid and first drying the first-coated lithiated compound, and the second surface-treatment layer is formed by second coating the first surface-treatment layer formed on the surface of the lithiated compound with a coating liquid and second drying the second-coated lithiated compound.

According to an additional embodiment of the invention, the coating liquid includes at least one coating element selected from the group consisting of Mg, Al, Co, K, and Na.

According to a yet additional embodiment of the invention, the coating and drying are carried out three or more times by using three or more kinds of coating liquids including at least one coating element selected from the group consisting of Mg, Al, Co, K, Na, Ca, Si, Ti, Sn, V, Ge, Ga, B, and As.

BRIEF DESCRIPTION OF THE DRAWINGS

A more complete appreciation of the invention, and many of the attendant advantages thereof, will become more readily apparent and appreciated as the same becomes better understood by reference to the following detailed description when considered in conjunction with the accompanying drawings, wherein.

DETAILED DESCRIPTION OF THE EMBODIMENTS

Reference will now be made in detail to the present preferred embodiments of the present invention, examples of which are illustrated in the accompanying drawings and specific Examples, wherein like reference numerals refer to the like elements throughout. The embodiments are described below in order to explain the present invention by referring to the figures and the specific Examples.

A positive active material for a rechargeable lithium battery of the present invention includes a core including a lithiated compound and at least two surface-treatment layers formed on the core. The surface-treatment layers include a coating-element-included hydroxide, a coating-element-included oxyhydroxide, a coating-element-included oxycarbonate, a coating-element-included hydroxycarbonate, or a mixture thereof. The coating element includes Mg, Al, Co, K, Na, Ca, Si, Ti, Sn, V, Ge, Ga, B, or As.

The lithiated compound is at least one compound selected from the following compounds represented by formulas (1) to (13):

| | |
|---|---|
| $Li_xMn_{1-y}M_yA_2$ | (1) |
| $Li_xMn_{1-y}M_yO_{2-z}X_z$ | (2) |
| $Li_xMn_2O_{4-z}X_z$ | (3) |
| $Li_xMn_{2-y}M_yA_4$ | (4) |
| $Li_xCo_{1-y}M_yA_2$ | (5) |
| $Li_xCo_{1-y}M_yO_{2-z}X_z$ | (6) |
| $Li_xNi_{1-y}M_yA_2$ | (7) |
| $Li_xNi_{1-y}M_yO_{2-z}X_z$ | (8) |
| $Li_xNi_{1-y}Co_yO_{2-z}X_z$ | (9) |
| $Li_xNi_{1-y-z}Co_yM_zA_\alpha$ | (10) |
| $Li_xNi_{1-y-z}Co_yM_zO_{2-\alpha}X_\alpha$ | (11) |
| $Li_xNi_{1-y-z}Mn_yM_zA_\alpha$ | (12) |
| $Li_xNi_{1-y-z}Mn_yM_zO_{2-\alpha}X_\alpha$ | (13) | wherein, $0.95 \leq x \leq 1.1$, $0 \leq y \leq 0.5$, $0 \leq z \leq 0.5$, $0 \leq a \leq 2$;

M is one selected from the group consisting of Al, Ni, Co, Mn, Cr, Fe, Mg, Sr, V, and rare earth elements;

A is selected from the group consisting of O, F, S and P; and

X is selected from the group consisting of F, S and P.

The lithiated compound is a lithium-cobalt based material, but it is understood that additional lithiated compounds are possible.

According to an embodiment of the invention, the surface-treatment layer includes two or more layers, each layer including at least one coating element selected from the group consisting of Mg, Al, Co, K, Na, Ca, Si, Ti, Sn, V, Ge, Ga, B, and As. According to another embodiment of the invention, the surface treatment layer comprises a single layer including two or more coating elements from the group. Preferably, the positive active material includes multi-layers of surface-treatments rather than a single surface-treatment layer since the former have improved charge and discharge characteristics and cycle-life performance over the latter. Most preferably, the positive active material includes a lithium-cobalt based material core, an Al-included first surface-treatment layer formed on the core, and an Si-included second surface-treatment layer formed on the first surface-treatment layer.

According to another embodiment of the invention, the surface-treatment layer further includes at least one coating-element-included oxyhydroxide, oxycarbonate, hydroxycarbonate or a mixture thereof.

The preparation of the positive active material of the present invention will be illustrated below in further detail. The coating element or a coating-element-included compound source is dissolved in a solvent to prepare a coating liquid including at least one coating element source. The coating liquid is either a liquid solution or a suspension. The solvent is either an organic solvent or water. The coating-element source includes any coating element that is soluble in an organic solvent or water, which includes Mg, Al, Co, K, Na, Ca, Si, Ti, V, Sn, Ge, B, As, or Zr, and preferably, Al or B.

The coating-element-included compound includes coating-element-included alkoxide, salt, or oxide according to an embodiment of the invention. Since the solubility of the coating-element source largely depends upon the types of solvents, one having ordinary skill in the art can easily choose a suitable coating-element source of the coating element (i.e. the coating-element-included alkoxide, salt or oxide) considering the type of the solvent. For example, if organic solvents are used as the solvent, the coating element, the coating-element-included alkoxide, the coating-element-included salt, or the coating-element-included oxide are chosen so that it is dissolved in the organic solvent, if necessary by using a reflux technique. Alternatively, if water is used as the solvent, then either a salt form or an oxide form of the coating element is soluble. For example, tetraethyl orthosilicate is usable as a silicone source for the coating element, whereas $B_2O_3$, $H_3BO_3$, or $HB(OH)_2$ can be used as a boron source. $HB(OH)_2$ is prepared by dissolving $B_2O_3$ in an organic solvent or water followed by drying the solution. For vanadium as a coating element, vanadium oxide ($V_2O_5$) or a vanadate such as ammonium vanadate ($NH_4(VO)_3$) may be used.

Examples of the organic solvents according to embodiments of the invention include, but are not limited to, an alcohol such as methanol, ethanol, or isopropanol. Other solvents according to embodiments of the invention include hexane, chloroform, tetrahydrofuran, ether, methylene chloride, and acetone.

The concentration of the coating element source in the coating liquid according to an embodiment of the invention is roughly at or between 0.1 and 10 wt %, and preferably at or between 0.1 and 5 wt % of the weight of the coating liquid. In a case when the concentration thereof is below 0.1 wt %, the coating is insufficient for a full desired effect, whereas in a case when the concentration of the coating element source is more than 5 wt %, the thickness of the resultant coating layer is too thick for the desired effect.

The resultant coating liquid is coated (encapsulated) on the surface of the particles of the lithiated compound selected from the compounds represented by formulas 1 to 13. According to another embodiment of the invention, the coating (encapsulating) process is either a sputtering method, a chemical vapor deposition (CVD) method, an impregnation method such as dip coating, or a method using any other general-purpose coating technique. Any other coating techniques, if available and applicable, may be as effective as the methods described herein. However, a preferred method is an impregnation method such as a dip coating method, which is the simplest method among the methods. The dip coating method is performed by impregnating a lithiated compound powder in a coating liquid and removing a solvent by a dipping process.

Alternatively, the coating process isa one-shot process in which the mixing, solvent-removing, and drying take place in a single process vessel according to an embodiment of the invention. This one-shot process is simple, thereby reducing production cost and making a uniform surface-treatment layer on the active material particles.

The one-shot process will be illustrated in further detail. The coating liquid and the lithiated compound selected from the compounds represented by the formulas 1 to 13 are put into a mixer according to an embodiment of the invention. The temperature of the mixer is raised while the content is being agitated during mixing.

In an additional embodiment, a blowing gas is introduced into the mixer. The blowing gas helps to facilitate evaporation of the solvent of the coating liquid and to purge impure gases that may be present in the mixer. The blowing gas may be $CO_2$ or a moisture-free harmless gas, such as nitrogen or argon. In the coating process, the lithiated compound is coated with the coating liquid in the mixer, and the solvent of the excess coating liquid may be evaporated and removed as the process temperature is increased while the process mixture is being continuously stirred.

Therefore, the transfer of the liquid-coated wet compound to another vessel (a tray) and the drying step in the tray can be combined into a single continuous process step ("one-shot") in a single vessel. In addition, after putting the lithiated compound and the coating liquid in the mixer, a premixing process may be further performed for 10 to 30 minutes to obtain a uniform mixture according to another embodiment of the invention.

The temperature of the mixer is increased to evaporate the solvent such as alcohol or water, for example, by circulating water heated at 50–100° C. through the outside wall of the mixer. The type of mixer is not limited to any one type as long as it is capable of mixing the lithiated compound with the coating liquid effectively, maintaining a vacuum, injecting the blowing gas if used, and increasing the temperature. A representative example of a mixer is a planetary mixer.

The coating process is performed by using at least one coating liquid including at least one coating element according to another embodiment of the invention. Alternatively, the coating process is performed by coating with a first coating liquid including at least one coating element for the first-coating layer, followed by drying and then coating with a second coating liquid including at least one coating element for the second-coating layer followed by drying. The coating process may also be performed for three times or more successively, with at least three different kinds of coating liquids. Preferably, the coating process is performed at least twice with at least two different kinds of coating liquids.

When two or more kinds of coating liquids are mixed in the coating process, the volume of each liquid is substantially equal to the other. However, the volumes need not be substantially equal in all aspects of the invention.

Regardless of the number of coating processes, each coating operation should be followed by a drying process, which may be performed at room temperature for 1 to 20 hours. In the case when the drying temperature is lower than the room temperature, the drying duration is unduly prolonged, while if the drying temperature is higher than 200° C., the desired quality of the surface-treatment layer may not be achieved. In the case when the drying duration is shorter than 1 hour, the desired quality of the surface-treatment layer may not be obtained, while if it is longer than 20 hours, the coating compound of the surface-treatment layer may be crystallized, resulting in a failure to facilitate the movement of $Li^+$ ions.

When using the one-shot coating process, a separate drying process is not necessary since the coating process is performed simultaneously with the drying process.

During the drying process, the coating liquid on the surface of the active material may react with moisture in the atmosphere to produce a hydroxide such that the surface-treatment layer including a new amorphous or crystalline coating-element-included hydroxide is formed on the surface. During the process, the surface-treatment layer may also produce a coating-element-included oxyhydroxide, a coating-element-included oxycarbonate, or a coating-element-included hydroxycarbonate due to a partial dehydration of the coating-element-included hydroxides and possible presence of atmospheric carbon dioxide which may react with the coating compound in the coating liquid.

If the coating process is performed once by using a single coating liquid including at least two coating elements, a single layer of AB compound is formed on the surface, wherein A and B are two different elements selected from Mg, I, Co, K, Na, Ca, Si, Ti, Sn, V, Ge, Ga, B, or As. However, when the coating process is performed at least twice, the multiple layers are formed. For example, a layer of the A compound is formed on a layer of the B compound.

The thickness of the surface-treatment layer is preferably in a range of 1 to 300 nm. When the thickness is less than 1 nm, the effect of forming the surface-treatment layer may be insufficient, whereas when it is more than 300 nm, the thickness is undesirably thick.

Since the surface-treatment layer formed on the core of the lithiated compound, it reduces the internal resistance of a cell containing the electrodes of the surface-treated compound. Thus, the charge and discharge-potential characteristics including overpotential on charging and voltage depression on discharging are improved significantly. It is thereby anticipated to enhance the power capability of the cell and also provide good cycle-life when the positive active material is coated according to the presently invented coating process.

As mentioned above, the coating process of the present invention for the positive active material for a rechargeable lithium battery involves a drying process, without a heat-treatment process, whereas the previous coating process involves a drying process as well as a heat-treatment process after the coating process. Therefore, the previous process resulted in a positive active material which is coated with a coating-element-included oxide on its surface. However, since the oxide layer of the coating element has a relatively low ion conductivity, the internal resistance and deterioration of the power characteristics of the cell containing the coated active material are undesirably severe. The coating method of the present invention is carried out without involving such a heat-treatment step such that the resultant surface-treatment layer of the positive active material is mainly a coating-element-included hydroxide. This positive active material exhibits excellent charging-discharging characteristics as compared with the positive active material coated with a coating-element-included oxide.

The lithiated compounds represented by the formulas 1 to 13 may be commercially purchased or prepared by the following methods.

Lithium sources are mixed with metal sources in a desirable equivalent ratio. The lithium source may be any non-metallic salts. Examples of the non-metallic salts are lithium nitrate, lithium acetate, and lithium hydroxide. The main metal sources include manganese sources, cobalt sources, nickel sources, or nickel-manganese sources. Typical examples of the manganese sources are manganese acetate and manganese dioxide. Typical examples of the cobalt sources are cobalt oxide, cobalt nitrate, and cobalt carbonate, whereas typical examples of the nickel sources are nickel hydroxide, nickel nitrate, and nickel acetate.

A mixed metal source may be prepared by a co-precipitation method. For example, the nickel-manganese sources may be prepared by co-precipitation of the nickel and manganese salts. Fluoride sources, sulfur sources, or phosphorous sources may be also used in addition to the metal sources such as manganese sources, cobalt sources, nickel sources, and nickel-manganese sources. The fluoride sources may be manganese fluoride or lithium fluoride and the sulfur sources may be manganese sulfide or lithium sulfide. The phosphorous sources may be $H_3PO_4$. It should be noted that the above lists of manganese, cobalt, nickel, nickel-manganese, fluoride, sulfur, and phosphorus sources are not intended to limit the present invention thereto.

In order to facilitate the reaction of the lithium sources and the metal sources, a small amount of a solvent such as ethanol, methanol, water, or acetone may be added to the mixture. The mixture may then be subjected to mortar grinding until the excess solvent disappears into the mixture.

The resulting mixture is heat-treated at about 400 to 600° C. to produce a powder of a semi-crystalline positive active material precursor of the lithiated compounds represented by formulas 1 to 13. Although other temperatures are possible, if the heat-treating operation temperature is less than 400° C., the metal sources may not react completely with the lithium sources. After drying or heat-treating the precursor powder, the powder of the heat-treated active material precursor may be remixed thoroughly while blowing dry air thereon to disperse the lithium sources uniformly.

The powder of semi-crystalline precursor is heat-treated (the second heat-treating operation) again at about 700 to 900° C. for about 10 to 15 hours to prepare a powder of a crystalline positive active material. As described above, if the second heat-treating step temperature is less than 700° C., it may be difficult to form a crystalline material. The heating step may be performed by increasing the temperature at the rate of 1 to 5° C./min under blowing dry air or oxygen. The mixture is allowed to stand at the first and second heat-treating temperature for a predetermined period of time, and then the mixture is cooled passively.

Figure 3:
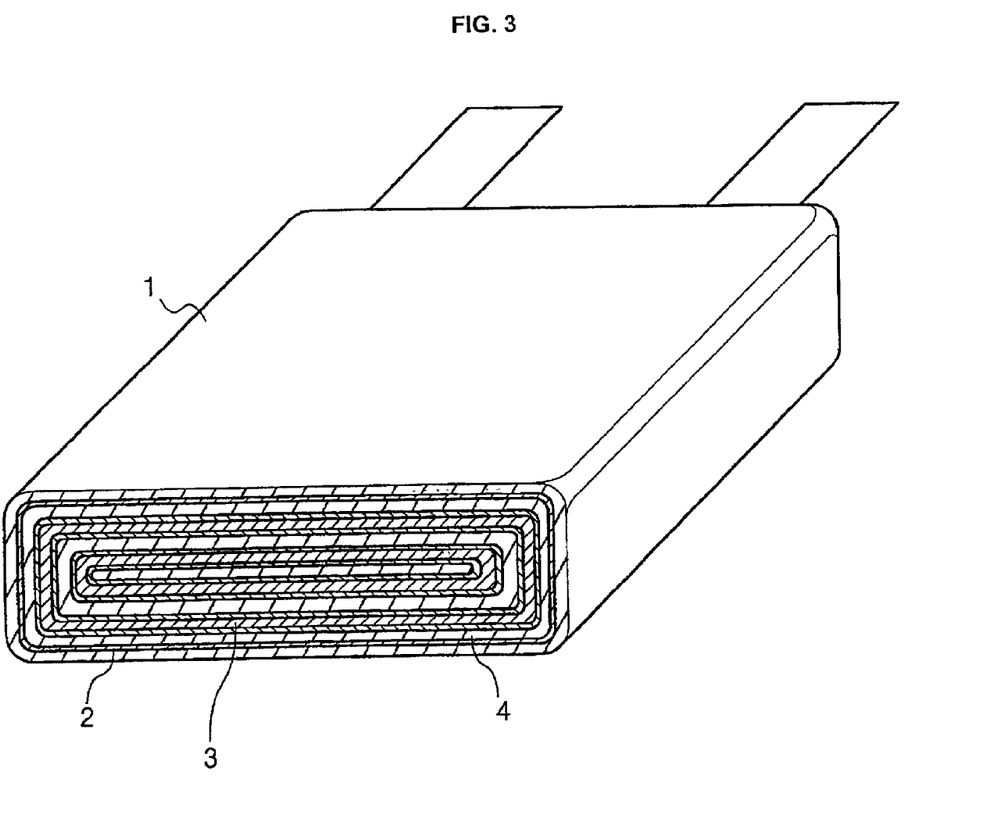
FIG. 3 shows a lithium battery according to an embodiment of the present invention.

A lithium battery according to an embodiment of the present invention is shown in FIG. 3 and includes a case 1 containing a positive electrode 3, a lithium counter electrode 4, and a separator 2 interposed between the positive electrode 3 and the lithium counter electrode 4. However, it is understood that other lithium batteries can be constructed using the positive active material according to the present invention.

The following examples illustrate the present invention in further detail, but it is understood that the present invention is not limited by these examples.

EXAMPLE 1

A 1% ethanol suspension of tetraethylorthosilicate was prepared by diluting 98% tetraethylorthosilicate (available from Aldrich Co.) suspension with ethanol. A 1%

Al-isopropoxide ethanol suspension was prepared by dissolving Al-isopropoxide powders in ethanol.

The tetraethylorthosilicate ethanol suspension was mixed with the Al-isopropoxide ethanol suspension in equal volume ratios to provide a coating liquid having ½% Al and ½% Si.

100 g of $LiCoO_2$ powder (available from UMKorea) was added to 40 ml of the coating liquid followed by mixing for about 10 minutes in an agitator to coat the $LiCoO_2$ powder with the suspension. The resultant product was allowed to stand for 30 minutes, rendering separation of a solid fraction and a suspension fraction, then a solid phase material was obtained by removing the suspension fraction. The obtained solid phase material was dried at 100° C. for 10 hours, and an Al and Si-included hydroxide layer was formed on the surface of the $LiCoO_2$ powder. The powder was ground and sieved to prepare a positive active material for a rechargeable lithium battery.

The prepared positive active material, a carbon conductive agent, and a polyvinylidene fluoride binder were mixed in a weight ratio of 94:3:3 in N-methyl pyrrolidone solvent to obtain a positive active material slurry. The positive active material slurry was cast on an Al foil and dried. The dried slurry formed a resultant film that was compressed to prepare a positive electrode. Using the positive electrode and a lithium metal counter electrode, a coin-type cell was fabricated in an Ar-purged glove box. For the electrolyte, a 1 M $LiPF_6$ solution of ethylene carbonate and dimethyl carbonate (1:1 volume ratio) was used.

EXAMPLE 2

A coin-type cell was fabricated by the same procedure as in Example 1, except that a 10% tetraethylorthosilicate suspension was mixed with a 10% Al-isopropoxide suspension to provide a coating liquid including 5% Al and 5% Si. The drying process was performed at 50° C. for 10 hours.

EXAMPLE 3

A coin-type cell was fabricated by the same procedure as in Example 1, except that a 2% tetraethylorthosilicate suspension was mixed with a 10% Al-isopropoxide suspension to provide a coating liquid including 5% Al and 1% Si. The drying process was performed at 85° C. for 10 hours.

EXAMPLE 4

A 1% ethanol suspension of the tetraethylorthosilicate coating liquid was prepared by diluting a 98% tetraethylorthosilicate (available from Aldrich Co.) solution with ethanol. 100 g of $LiCoO_2$ powder (available from UMKorea) was added to 40 ml of the tetraethylorthosilicate suspension, followed by mixing for about 10 minutes in an agitator to coat the surface of the $LiCoO_2$ powder for the first coating with the suspension. The resultant suspension-wet mixture was allowed to stand for 30 minutes. The wet mixture was dried at 100° C. for 10 hours. An Si-included hydroxide layer was formed on the surface of the $LiCoO_2$ powder as the result of the coating.

Subsequently, the $LiCoO_2$ powder with the Si-included hydroxide layer on its surface was added to 40 ml of a 1% Al-isopropoxide suspension, and the mixture was stirred in an agitator to coat the powder uniformly for the second coating of the surface of the $LiCoO_2$ powder with the suspension. The 1% Al-isopropoxide suspension was prepared by dissolving Al-isopropoxide powder in ethanol. The resultant suspension-wet mixture was allowed to stand for 30 minutes. The wet-mixture was dried at 100° C. for 10 hours. An Al-included hydroxide layer was formed on the surface of the Si-included hydroxide layer of the $LiCoO_2$ powder, as the result of the coating. The resultant powder was ground and sieved to prepare a positive active material for a rechargeable lithium battery.

Using the slurry, a coin-type cell was fabricated by the same procedure as in Example 1.

EXAMPLE 5

A coin-type cell was fabricated by the same procedure as in Example 4, except that a 1% Al-isopropoxide suspension was used for the first coating liquid and a 1% tetraethylorthosilicate suspension was used for the second coating liquid.

Comparative Example 1

$LiCoO_2$ (available from UMKorea) powder, a conductive agent and a binder were mixed in a weight ratio of 94:3:3 in N-methyl pyrrolidone solvent to obtain a positive active material slurry.

Using the slurry, a coin-type cell was fabricated by the same procedure as in Example Reference Example 1

A 0.1% ethanol suspension of Al-isopropoxide coating liquid was prepared by dissolving an Al-isopropoxide powder in ethanol. 100 g of $LiCoO_2$ powder (available from UMKorea) was added to 40 ml of the coating liquid, followed by mixing for about 10 minutes in an agitator to coat the surface of $LiCoO_2$ powder with the suspension. The resultant product was allowed to stand for 30 minutes, rendering separation of a solid fraction and a solution fraction, then a solid phase material was obtained by removing the solution fraction. The obtained solid phase material was dried at 100° C. for 10 hours so that an Al-included hydroxide layer was formed on the surface of $LiCoO_2$ powder. The resultant powder was ground and sieved to prepare a positive active material for a rechargeable lithium battery.

Reference Example 2

A positive active material was prepared by the same procedure as in Reference Example 1, except that a 1% Al-isopropoxide suspension was used as a coating liquid and the drying process was performed at 50° C. for 10 hours.

Reference Example 3

A positive active material was prepared by the same procedure as in Reference Example 1, except that a 5% Al-isopropoxide suspension was used as a coating liquid and the drying process was performed at 85° C. for 10 hours.

Reference Example 4

A positive active material was prepared by the same procedure as in Reference Example 1, except that a 1% tetraethylorthosilicate suspension was prepared as a coating liquid by diluting a 98% ethanol suspension of tetraethylorthosilicate (available from Aldrich Co.) with isopropyl alcohol.

Reference Example 5

A positive active material was prepared by the same procedure as in Reference Example 4, except that a 5% tetraethylorthosilicate suspension was used as a coating liquid and the drying process was performed at 25° C. for 24 hours.

Figure 1A:
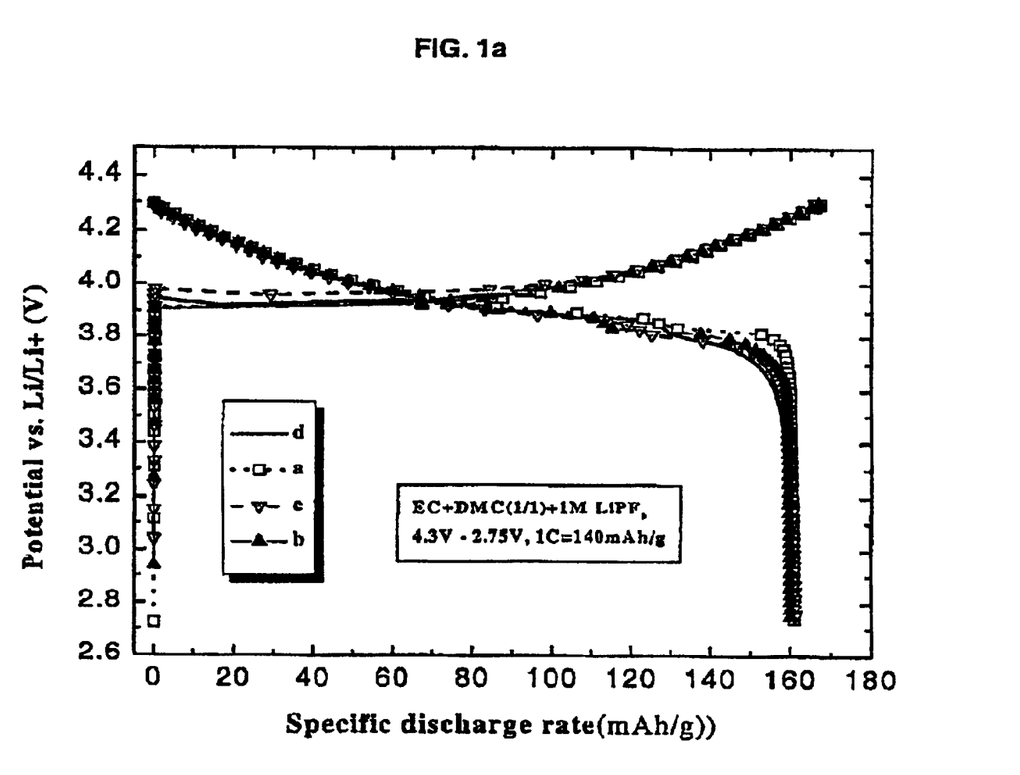
FIGS. 1a to 1c are graphs showing capacity and voltage performance at various charge and discharge rates of positive active materials prepared by the methods of Examples 1 (a) and 5 (b) of an embodiment of the present invention, Reference Example 4 (d), and Comparative Example 1 (c)
Figure 1B:
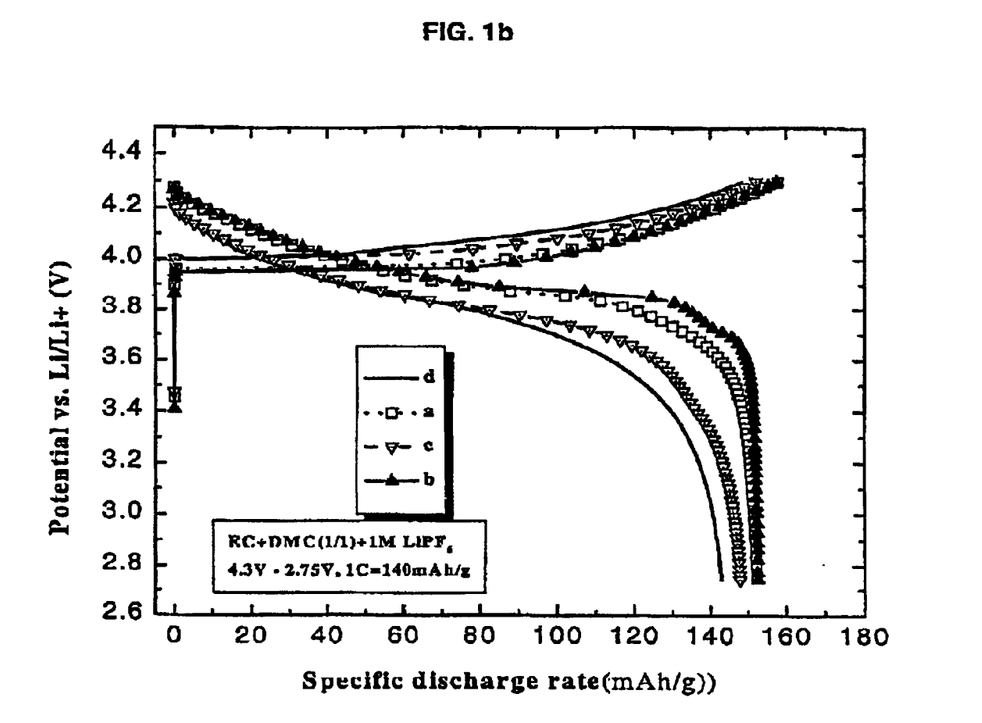
Figure 1C:
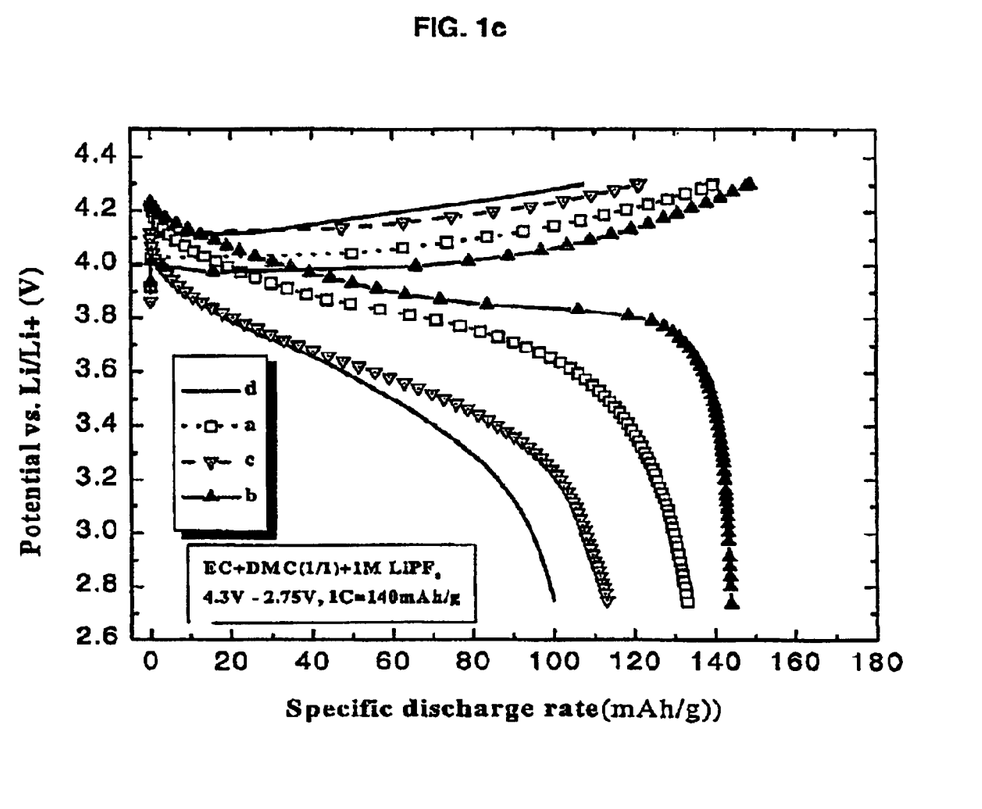

FIG. 1 shows the results of charge-discharge characteristics at various charge and discharge rates of Examples 1 and 5, Comparative Example 1, and Reference Example 4. As shown in FIGS. 1a to 1c, the active material of Example 1, in which a single layer of Al and Si-included hydroxide is formed on the LiCoO$_2$ powder (referred to as "a" in FIGS. 1a to 1c), and the active material of Example 5, in which a first layer of Al-included hydroxide and a second layer of Si-included hydroxide are formed on the LiCoO$_2$ powder (referred to as "b" in FIGS. 1a to 1c), are superior in charge and discharge characteristics to the bare LiCoO$_2$ powder of Comparative Example 1 (referred to as "c" in FIGS. 1a to 1c) and the active material with a single layer of Si-included hydroxide of Reference Example 4 (referred to as "d" in FIGS. 1a to 1c). Particularly, upon increasing the charge and discharge rate from a low rate (0.1 C) to a high rate (1.0 C), the superiority is pronounced.

Tables 1 and 2 respectively show specific discharge capacity and the discharge voltage of the cell at various charge and discharge rates.

TABLE 1

Specific discharge capacity

|  | 0.1 C | 0.5 C | 1 C |
|---|---|---|---|
| Reference Example 4 | 160 | 143 | 100 |
| Example 5 | 160 | 153 | 144 |
| Example 1 | 161 | 152 | 133 |
| Comparative Example 1 | 161 | 148 | 113 |

TABLE 2

Discharging voltage of the cell (V)

|  | 0.1 C | 0.5 C | 1 C |
|---|---|---|---|
| Reference Example 4 | 3.92 | 3.81 | 3.58 |
| Example 5 | 3.92 | 3.89 | 3.87 |
| Example 1 | 3.92 | 3.89 | 3.82 |
| Comparative Example 1 | 3.91 | 3.82 | 3.59 |

As shown in Tables 1 and 2, at a high rate, the positive active materials of Examples 1 and 5 are superior in charge-discharge characteristics to those of Comparative Example 1 and Reference Example 4, since the specific discharge capacity and the discharge voltage of the former are higher than those of the latter.

Figure 2:
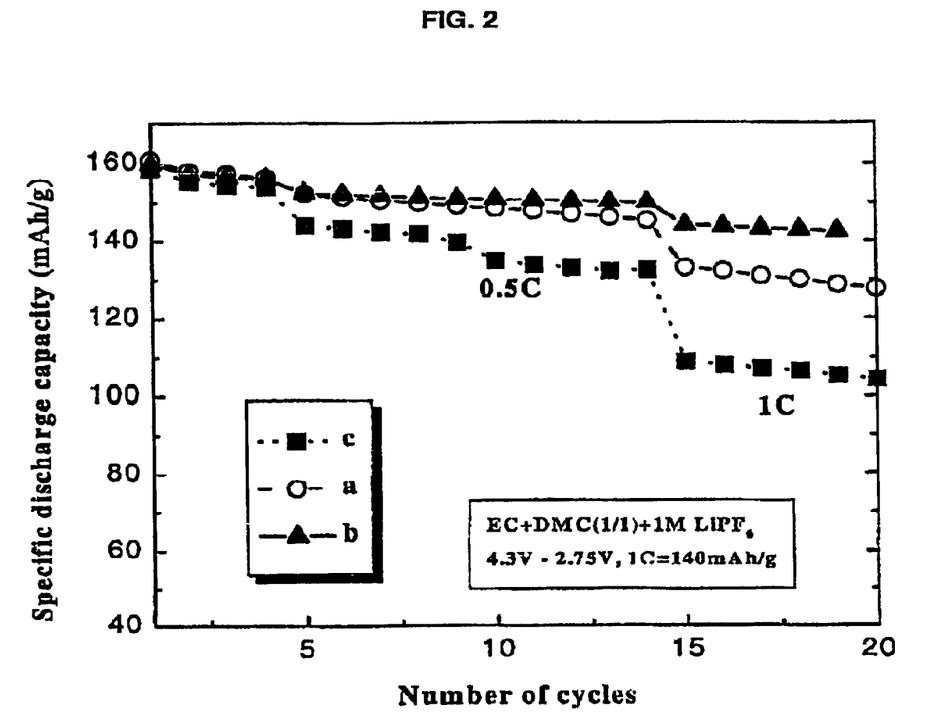
FIG. 2 is a graph showing cycle-life characteristics of positive active materials according to Examples 1 (a) and 5 (b) of embodiments of the present invention, and Comparative Example 1 (c)

FIG. 2 shows the cycle-life characteristics of Examples 1 and 5 and Comparative Example 1. The cycle-life was measured at various charge-discharge rates in the following sequence: one cycle at 0.1 C rate, 3 cycles at 0.2 C, 10 cycles at 0.5 C, and 6 cycles at 1 C. The positive active material of Example 5 ("b" of FIG. 2) exhibits the best cycle-life characteristics. Example 1 ("a" of FIG. 1) exhibits the second best cycle-life characteristics. Specifically, Example 1 exhibits characteristics that are not as good as those of Example 5, but which are better than those of Comparative Example 1 ("c" of FIG. 2).

As disclosed above, the positive active material for the rechargeable lithium battery of the present invention includes at least two surface-treatment layers including at least one coating-element-included hydroxide, oxyhydroxide, oxycarbonate, or hydroxycarbonate, so that the resultant battery has been improved in charge and discharge characteristics at a high rate, as well as in cycle-life characteristics.

While the present invention has been described in detail with reference to the preferred embodiments, those skilled in the art will appreciate that various modifications and substitutions can be made thereto without departing from the spirit and scope of the present invention as set forth in the appended claims and equivalents thereof.

What is claimed is:

1. A positive active material for a rechargeable lithium battery comprising:

a core comprising a lithiated compound; and at least two surface-treatment layers formed on said core, each of said surface-treatment layers comprising at least one compound selected from the group consisting of a coating-element-included hydroxide, a coating-element-included oxyhydroxide, a coating-element-included oxycarbonate, and a coating-element-included hydroxycarbonate, wherein the coating element is selected from the group consisting of Al, Si, Ti, Sn, V, Ge, Ga, B, and As.

2. The positive active material according to claim 1, wherein:

the lithiated compound is selected from the group consisting of compounds represented by the formulas 1 to 13:

| | |
|---|---|
| $Li_xMn_{1-y}M_yA_2$ | (1) |
| $Li_xMn_{1-y}M_yO_{2-z}X_z$ | (2) |
| $Li_xMn_2O_{4-z}X_z$ | (3) |
| $Li_xMn_{2-y}M_yA_4$ | (4) |
| $Li_xCo_{1-y}M_yA_2$ | (5) |
| $Li_xCo_{1-y}M_yO_{2-z}X_z$ | (6) |
| $Li_xNi_{1-y}M_yA_2$ | (7) |
| $Li_xNi_{1-y}M_yO_{2-z}X_z$ | (8) |
| $Li_xNi_{1-y}Co_yO_{2-z}X_z$ | (9) |
| $Li_xNi_{1-y-z}Co_yM_zA_\alpha$ | (10) |
| $Li_xNi_{1-y-z}Co_yM_zO_{2-\alpha}X_\alpha$ | (11) |
| $Li_xNi_{1-y-z}Mn_yM_zA_\alpha$ | (12) |
| $Li_xNi_{1-y-z}Mn_yM_zO_{2-\alpha}X_\alpha$ | (13), |

$0.95 \leq x \leq 1.1$, $0 \leq y \leq 0.5$, $0 \leq z \leq 0.5$, $0 \leq \alpha \leq 2$, M is one selected from the group consisting of Al, Ni, Co, Mn, Cr, Fe, Mg, Sr, V, or rare earth elements, A is selected from the group consisting of O, F, S and P, and X is selected from the group consisting of F, S and P.

3. The positive active material according to claim 1, wherein said at least two surface-treatment layers comprise at least two coating elements selected from the group consisting of Al, Si, Ti, Sn, V, Ge, Ga, B, and As.

4. A method of preparing a positive active material for a rechargeable lithium battery comprising:

coating a lithiated compound with a coating liquid comprising at least two coating elements selected from the group consisting of Al, Si, Ti, Sn, V, Ge, Ga, B, and As; and drying the coated compound.

5. The method according to claim 4, wherein:

the lithiated compound is selected from the group consisting of compounds represented by the formulas 1 to 13:

$Li_xMn_{1-y}M_yA_2$ (1)
$Li_xMn_{1-y}M_yO_{2-z}X_z$ (2)
$Li_xMn_2O_{4-z}X_z$ (3)
$Li_xMn_{2-y}M_yA_4$ (4)
$Li_xCo_{1-y}M_yA_2$ (5)
$Li_xCo_{1-y}M_yO_{2-z}X_z$ (6)
$Li_xNi_{1-y}M_yA_2$ (7)
$Li_xNi_{1-y}M_yO_{2-z}X_z$ (8)
$Li_xNi_{1-y}Co_yO_{2-z}X_z$ (9)
$Li_xNi_{1-y-z}Co_yM_zA_\alpha$ (10)
$Li_xNi_{1-y-z}Co_yM_zO_{2-\alpha}X_\alpha$ (11)
$Li_xNi_{1-y-z}Mn_yM_zA_\alpha$ (12)
$Li_xNi_{1-y-z}Mn_yM_zO_{2-\alpha}X_\alpha$ (13), $0.95 \leq x \leq 1.1$, $0 \leq y \leq 0.5$, $0 \leq z \leq 0.5$, $0 \leq \alpha \leq 2$, M is one selected from the group consisting of Al, Ni, Co, Mn, Cr, Fe, Mg, Sr, V, or rare earth elements, A is selected from the group consisting of O, F, S and P, and X is selected from the group consisting of F, S and P.

6. The method according to claim 5, wherein said drying the coated compound is performed at a temperature ranging from room temperature to 200° C.—for 1 to 24 hours.

7. The method according to claim 5, wherein said coating the lithiated compound comprises mixing the lithiated compound with the coating liquid while heating the lithiated compound and coating liquid at an increasing temperature.

8. The method according to claim 7, wherein said coating comprises mixing the lithiated compound with the coating liquid under one of a vacuum condition and a condition of injecting blowing gas while increasing the temperature.

9. The method according to claim 5, wherein said coating and said drying comprise:
   first-coating the lithiated compound with the coating liquid comprising at least two coating elements selected from the group consisting of Al, Si, Ti, Sn, V, Ge, Ga, B, and As,
   first-drying the first-coated lithiated compound to provide a first surface-treatment layer on a surface of the lithiated compound,
   second-coating the first surface-treatment-formed lithiated compound with another coating liquid comprising at least two coating elements selected from the group consisting of Al, Si, Ti, Sn, V, Ge, Ga, B, and As, wherein at least one of the two coating elements is different from the coating elements selected for the first surface treatment, and
   second-drying the second-coated lithiated compound to provide a second surface-treatment layer on the first surface-treatment layer of the lithiated compound.

10. The method according to claim 5, wherein said coating and said drying comprise using at least three kinds of coating liquids, the coating liquids comprising at least one coating element selected from the group consisting of Al, Si, Ti, Sn, V, Ge, Ga, B, and As.

11. A positive active material for a rechargeable lithium battery comprising:
   a core comprising a lithiated compound;
   a first surface-treatment layer formed on said core, said first surface-treatment layer comprising at least one compound selected from the group consisting of an Al-included hydroxide, an Al-included oxyhydroxide, an Al-included oxycarbonate, and an Al-included hydroxycarbonate; and
   a second surface-treatment layer formed on said first surface-treatment layer, said second surface-treatment layer comprising at least one compound selected from the group consisting of an Si-included hydroxide, an Si-included oxyhydroxide, an Si-included oxycarbonate, and an Si-included hydroxycarbonate.

12. A method of fabricating a positive active material for a rechargeable lithium battery comprising:
   coating a lithium-cobalt based compound with a first coating liquid comprising Al to form a first coating;
   coating the first coating with a second coating liquid comprising Si; and
   drying the lithium-cobalt based compound coated with the first and second coatings at a temperature ranging from room temperature to 200° C. for 1 to 24 hours.

13. The method according to claim 12, wherein said coating the lithium-cobalt based compound with the first and/or second coating liquid and said drying comprises mixing the lithium-cobalt based compound with the first and/or second coating liquid while heating the lithium-cobalt based compound and the first and/or second coating liquid by increasing the temperature.

14. The method according to claim 13, wherein the mixing the lithium-cobalt based compound with the first and/or second coating liquid comprises mixing under one of a vacuum condition and a condition of injecting blowing gas while increasing the temperature.

15. A positive active material for a rechargeable lithium battery, comprising:
   a core comprising a lithium-cobalt based compound;
   a first surface-treatment layer formed on said core, said first surface-treatment layer comprising at least one compound selected from the group consisting of an Si-included hydroxide, an Si-included oxyhydroxide, an Si-included oxycarbonate, and an Si-included hydroxycarbonate; and
   a second surface-treatment layer formed on said first surface-treatment layer, said second surface-treatment layer comprising at least one compound selected from the group consisting of an Al-included hydroxide, an Al-included oxyhydroxide, an Al-included oxycarbonate, and an Al-included hydroxycarbonate.

16. A method of fabricating a positive active material for a rechargeable lithium battery comprising:
   coating a lithium-cobalt based compound with a first coating liquid comprising Si to form a first coating;
   coating the first coating with a second coating liquid comprising Al to form a second coating; and
   drying the lithium-cobalt based compound coated with the first and second coatings at a temperature ranging from room temperature to 200° C. for 1 to 24 hours.

17. The method according to claim 16, wherein said coating the lithium-cobalt based compound with the first and/or second coating liquid is performed by mixing the lithium-cobalt based compound with the first and/or second coating liquid while increasing the temperature.

18. The method according to claim 17, wherein the mixing the lithium-cobalt based compound with the first and/or second coating liquid comprises mixing under one of a vacuum condition and a condition of injecting blowing gas and increasing the temperature.

19. A method of preparing a positive active material for use in a lithium battery, comprising:

mixing a lithiated compound with first and second compounds sequentially to form a first surface treatment layer and a second treatment layer while increasing a temperature during said mixing to form a surface treatment layer including the first and second compounds sequentially layered on the lithiated compound, the first and second compounds comprising corresponding first and second coating elements selected from the group consisting of Al, Si, Ti, Sn, V, Ge, Ga, B, and As.

20. The method of claim 19, wherein said mixing comprises heating to form a layer comprising mainly a first or second coating-element including hydroxide, oxyhydroxide, oxycarbonate, hydroxycarbonate, and/or a mixture thereof.

21. The method of claim 19, wherein said mixing comprises:

mixing the lithiated compound with the first compound to form a first coating layer on the lithiated compound, and mixing the lithiated compound having the first coating layer with the second compound to form a second coating layer on the first coating layer.

22. The method of claim 19, further comprising blowing a gas through the lithiated compound during said mixing.

23. A lithium battery comprising:

a positive electrode comprising a coated lithiated compound, the coating comprising a surface treatment layer comprising first and second compounds, sequentially layered, the first and second compounds comprising corresponding first and second coating elements selected from the group consisting of Al, Si, Ti, Sn, V, Ge, Ga, B, and As;

a negative electrode comprising a material to reversibly intercalate lithium ions; and a separator and an electrolyte disposed between said first and second electrodes.

24. A The lithium battery of claim 23, wherein the surface treatment layer comprises a first coating layer of the first compound and a second coating layer of the second compound.

25. The lithium battery of claim 23, wherein the surface treatment layer is formed by drying the first and second compounds to form a layer comprising mainly a first or second coating-element including hydroxide, oxyhydroxide, oxycarbonate, hydroxycarbonate, and/or a mixture thereof.

* * * * *

UNITED STATES PATENT AND TRADEMARK OFFICE
CERTIFICATE OF CORRECTION

PATENT NO. : 6,797,435 B2
DATED : September 28, 2004
INVENTOR(S) : Ho-jin Kweon et al.

It is certified that error appears in the above-identified patent and that said Letters Patent is hereby corrected as shown below:

Column 12,
Line 62, after "and As" insert -- to form at least two surface-treatment layers, each of said surface-treatment layers comprising at least one compound selected from the group consisting of a coating-element-included hydroxide, a coating-element-included oxyhydroxide, a coating-element-included oxycarbonate, and a coating-element-included hydroxycarbonate. --

Column 13
Line 5, change "$Li_xMn_2O_4\ _zX_z$ (3)" to -- $Li_xMn_2O_{4-z}X_z$ (3) --.

Signed and Sealed this

Eighth Day of March, 2005

JON W. DUDAS
*Director of the United States Patent and Trademark Office*